F. E. BALDWIN.

ACETYLENE GAS GENERATING LAMP.

APPLICATION FILED FEB. 5, 1913.

Reissued Mar. 11, 1913.

13,542.

Witnesses:
A. White
J. G. Donovan

Inventor:
Frederic E. Baldwin
by his Attys:
Philipp, Sampson, Rust & Kennedy

UNITED STATES PATENT OFFICE.

FREDERIC E. BALDWIN, OF NEW YORK, N. Y.

ACETYLENE-GAS-GENERATING LAMP.

13,542. Specification of Reissued Letters Patent. Reissued Mar. 11, 1913.

Original No. 821,580, dated May 22, 1906, Serial No. 165,587. Application for reissue filed February 5, 1913. Serial No. 746,396.

*To all whom it may concern:*

Be it known that I, FREDERIC E. BALDWIN, a citizen of the United States, residing in New York, county of Richmond, and State of New York, have invented certain new and useful Improvements in Acetylene-Gas-Generating Lamps, fully described and represented in the following specification and the accompanying drawings, forming a part of the same.

The invention upon which is based the present application for Letters Patent is a lamp designed to generate and burn acetylene or similar gas, and is an improvement on the form described and shown in a patent granted to me August 28, 1900, No. 656,874. Like the lamps of said patent, that of the present application is intended for use and adapted to use as a bicycle, automobile, yacht, or miner's lamp, or for any other analogous purpose, it being necessary only to change its form or dimensions to adapt it to any one of the purposes mentioned.

Figure 1:
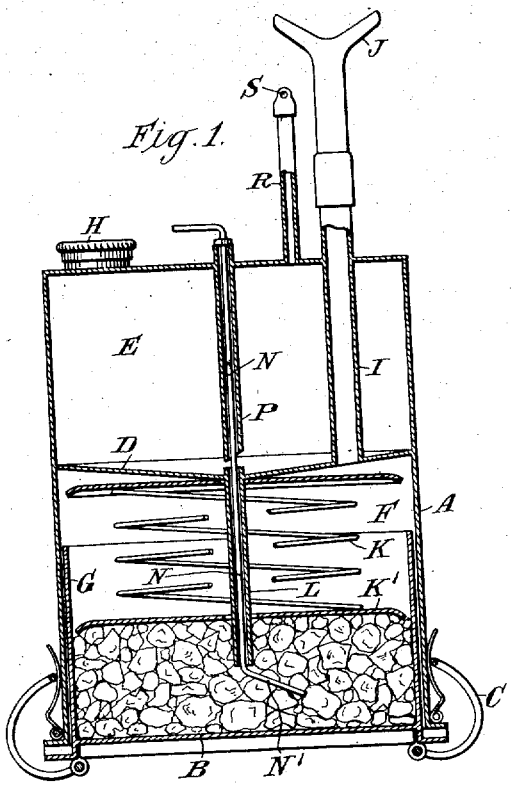
Figure 2:
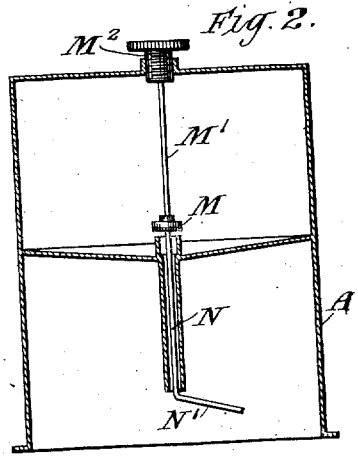
Figure 4:
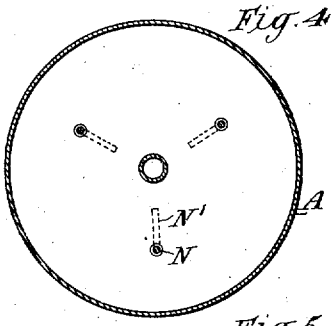
Figure 3:
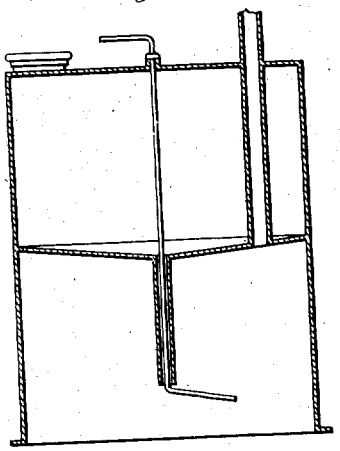
Figure 5:
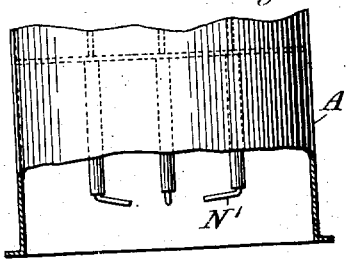
Figure 6:
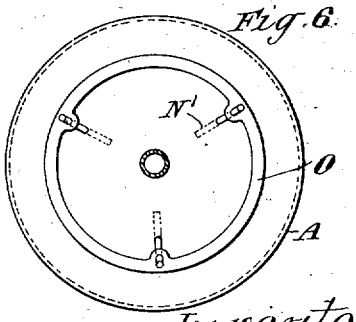

In the drawings hereto annexed, Figure 1 is a central vertical section of the complete lamp. Fig. 2 is a similar view of a portion of the lamp, exhibiting a modification. Fig. 3 is a similar view of a further modification. Figs. 4, 5, and 6 are details of parts of the lamp, showing another modification.

The features of novelty which characterize my present invention reside in details of construction and will be pointed out in the course of the following description of the devices illustrated in the drawings and the manner of using the same, and more particularly specified in the subjoined claims.

Generally considered, the lamp is one comprising a metallic or other receptacle A, preferably provided with a bottom B, which may be readily detached and which when the lamp is in use is held firmly in position by suitable clamps C, so as to make a water and gas tight closure.

The receptacle is divided, preferably horizontally, by a partition D into two compartments, the upper one, E, designed to serve as a water-chamber or reservoir, the lower, F, as a gas-generating chamber adapted to contain a receptacle G for calcium carbid, which is generally attached to or forms the detachable bottom.

In the top of the lamp is an orifice closed by a screw cap H or similar device for the introduction of water to the reservoir, and from the gas-generating chamber F through the water-reservoir E and out through the top of the lamp extends a tube I, which conducts the gas to the burner J.

I proceed now to a detailed description of the features enumerated below, which I have devised as improvements in lamps of the general character above described.

*The means for effecting and controlling the generation of gas.*—A quantity of calcium carbid, preferably in a finely divided condition, is placed in the receptacle G and retained by any suitable device, such as a spiral spring K, interposed between the bottom of the water reservoir E and a loosely fitting or perforated plate K′, care being taken to adjust the tension of the spring so that the proper degree of pressure will be exerted upon the mass of carbid. A tube L leads from the water-reservoir down into the receptacle G and forms a duct which introduces the water into the body of carbid which said receptacle is designed to contain.

Various means have been employed to regulate or control the normal rate of flow of water through a water-supply tube. For example, the bore of the tube has been made of small diameter; but this plan has not been found practical for various reasons. In the first place, the discharge outlet thereof is under pressure of several inches of water, and it is practically impossible to make the bore so minute that the water will issue in sufficiently small quantity. If the attempt is made to secure this small flow by making the tube very minute, it then becomes so easily clogged that the operation of the lamp is rendered extremely uncertain. The smallest particle of foreign matter in the water or a bit of slaked carbid carried into the bore by back pressure of the gas will stop the flow completely, and the lamp will go out. Such a tube is also difficult, in fact, almost impossible, to clean. Another method which has been employed is to use a duct of comparatively large bore and fill the same with a wick of more or less loose texture for the purpose of checking the supply. This for a time operates with some degree of success, though from the very nature of the material used the precise amount of the feed can never be exactly determined. A valve is generally necessary to regulate the supply. Furthermore, when the lamp has been used for a time the wick, which of course must act as a strainer, becomes filled with solid matter—such as sand, dirt, and organic particles contained in the water—so that the feed is reduced. This necessitates frequent adjustment of the valve to restore the proper supply. In time the wick becomes completely choked, and the user, often unskilful in such matters, must tamper with the lamp and insert a new wick, which is at best a troublesome procedure. Again, if the lamp has not been used for some time the wick dries out, and a very appreciable time is required to soak it up so that the water will again flow through.

The method which I have invented for securing the proper feed under all circumstances without the above objectionable features is to make the bore of the duct of comparatively large size, extend the tube which forms the duct downward so that its end will be always embedded in the carbid, and then restrict the duct by means of a wire or rod preferably centrally located therein to leave a channel of the proper size. This arrangement is simple; but in a long experience it has been found to be entirely successful. It is possible to secure the correct drop-by-drop feed with a duct of considerable size, since the friction of the water on the large area of the tube-wall and wire reduces its flow. This retarding-friction may be regulated by varying the size of wire used. The duct does not become choked, since if foreign particles are deposited therein the water can take a zigzag course around it without the supply being appreciably affected. If it is at any time necessary to clean the tube, the wire is simply reciprocated and rotated a few times from the outside of the lamp without disturbing the position of other parts. This nice regulation of the flow enables me to entirely dispense with the troublesome adjustment of the valve. If a valve is used at all, it is employed to shut off the flow entirely and not to regulate it. The construction just described is shown in Fig. 1, in which L is the water-supply tube, and N the constricting wire. In this illustration the size of the parts is of course exaggerated. Fig. 2 shows a similar construction with a valve M on the constricting-wire M′ which may be set by turning the screw-plug $M^2$ in the top of the lamp. In some cases, however, there is employed in connection with the means for introducing the water into the mass of carbid a device in the nature of a stirrer, which on proper manipulation may be used to break up the mass of carbid surrounding the outlet of the water duct and which by having become slaked and caked by the action of water prevents the proper percolation of the latter to the unslaked carbid in the receptacle G, Fig. 1. As such device I employ a stem or rod N, which extends down through the tube L and is bent at substantially right angles to form an arm N′. This rod may form a prolongation of the valve-stem M′ of Fig. 2 or in case no valve is used may extend from the top of the lamp down through the water-reservoir, as shown in Fig. 3. It will be understood from what has been said that the function of the stirrer is to break up, pierce or disturb the particles of the slaked carbid mass which, when the lamp is in use, forms at the delivery end of the tube. This slaked carbid mass tends to solidify and either shuts the water off altogether or restricts it so that less water is delivered from the water-tube than the lamp demands for efficient operation. As it is sufficient, under certain circumstances, to insure the requisite water flow by so manipulating the stirrer, as to pierce, break up, or loosen the slaked carbid mass immediately around or at the mouth of the tube, it is obvious that the stirrer need not always be formed with a bent end or so as to extend radially from the mouth of the tube.

As calcium carbid possesses strongly absorptive properties, the introduction of water through the tube L will result in the gradual slaking of the material about its outlet; but the lime thus produced becomes gradually less permeable to the water, so that an insufficient quantity of gas is generated to maintain the proper flame. When this becomes noticeable, the rod N is turned, so as to cause the arm N′ to break up to a greater or less extent the mass of lime, and in practice I have found that under ordinary conditions this is amply sufficient to insure a substantially uniform generation of gas until all of the carbid in the receptacle G is exhausted.

In the larger-sized lamps it is desirable to employ two or more water-tubes L and, if desired, stirring-rods N, extending down to different points in the carbid-receptacle. This is indicated in Fig. 4, which is an under plan view of the bottom D of the water-reservoir, showing three water-tubes L in section. It is, however, desirable when a plurality of stirring rods are employed that some means be provided for actuating all of them simultaneously. A device suitable for this purpose is shown in Fig. 6, in which O is a ring placed on top of the lamp, with which bent ends of all the rods N engage, so that a partial rotation of the ring will impart a corresponding movement to each rod.

*The means for consuming an excess of gas.*—Although the means described above effect a remarkably uniform generation of gas, it sometimes occurs that an amount of gas in excess of that required for the burner is temporarily produced, and the usual plan is to provide some channel for its escape into the air. When the lamps are used in confined places, however, this method of disposing of the unconsumed gas is objectionable, owing to its very disagreeable odor. To remedy this, I provide a channel of escape, which terminates in the immediate vicinity of the burner proper, so that any excess of gas which may issue will be ignited by the flame of the burner and consumed. This may be accomplished in various ways; but the most practical of which I am at present aware is that shown in Fig. 1. In this figure there is shown a tube P, which extends downward from the top of the lamp to a point near the orifice of the water-tube L in the lower part of the water-reservoir E. The rod N extends through this tube without leaving sufficient space for passage of escaping gas. The air to replace the water which flows into the carbid-chamber enters through the burner and tube hereinafter described. When more gas is generated than is carried off by the burner tube, it forces the water up through the tube L and enters the water-reservoir. Practically none of the gas will find its way up the tube P under any circumstances, but rising to the upper part of the reservoir E it escapes through a tube R, provided with a vent S of such character as to constitute a burner and in such close proximity to the main burner J that any gas issuing through it will be ignited by the flame of the latter and burned.

The specific construction of the various parts of my lamp may be, as will be seen from a consideration of the nature of the improvements, very greatly varied without departing from the invention.

What I claim is:—

1. In a lamp of the kind described, the combination with a water-reservoir, and a receptacle for calcium carbid, of a tube extending from the former a considerable distance into the latter so as to be embedded in the mass of carbid contained in said receptacle, and a rod or stem extending through said tube into the carbid-receptacle and having its end formed as a stirrer to break up the slaked carbid around the outlet of the water-tube, as set forth.

2. In a lamp of the kind described, the combination with a water-reservoir, and a receptacle for calcium carbid, of a tube extending from the former into the latter so as to be embedded in the mass of carbid contained in the receptacle, a rod extending from a point outside of the lamp through the tube and into the carbid-chamber and having its end bent to form a stirrer for breaking up the slaked carbid around the outlet of the water-tube, as set forth.

3. In a lamp of the kind described, the combination with a water-reservoir, and a receptacle for calcium carbid, of a plurality of tubes extending from the former into the latter so as to be embedded in the mass of carbid contained in the receptacle, a stirrer passing through each tube adapted to break up the slaked carbid around the end of the tube, and means for actuating all the stirrers simultaneously, as set forth.

4. In a lamp of the kind described, the combination with a water-reservoir, and a receptacle for calcium carbid, of a water-tube extending from the former a considerable distance into the latter and adapted to be embedded in the mass of carbid in the receptacle, and a rod extending through the water-tube, and constituting a stirrer to break up slaked carbid around the outlet of the water tube, the rod operating to restrict and thus control the flow of water to the carbid, as set forth.

5. In a lamp of the kind described, the combination with a water-reservoir, a carbid-receptacle, and a tube restricted by a wire extending into the carbid-receptacle from outside the lamp and open to the water-reservoir, a tube exterior to the lamp, connected with the reservoir and adjacent to the main burner, and equipped with a burner, said auxiliary burner acting as an air-vent to admit air during the normal operation of the lamp.

In witness whereof I have hereunto set my hand in the presence of two subscribing witnesses.

FREDERIC E. BALDWIN.

Witnesses:

AUGUSTA WHITE,

JAMES Q. RICE.